US012166415B2

(12) United States Patent
Bouchez et al.

(10) Patent No.: US 12,166,415 B2
(45) Date of Patent: Dec. 10, 2024

(54) SWITCHING SYSTEM AND METHOD WITH DOWN TIME, CORRESPONDING COMPUTER PROGRAM

(71) Applicant: Valeo Siemens eAutomotive France, Cergy (FR)

(72) Inventors: Boris Bouchez, Solbergelva (NO); Mathieu Dihal, Fresnes (FR); Kolli Abdelfatah, Reims (FR)

(73) Assignee: Valeo Siemens eAutomotive France, Cergy (FR)

( * ) Notice: Subject to any disclaimer, the term of this patent is extended or adjusted under 35 U.S.C. 154(b) by 206 days.

(21) Appl. No.: 17/793,179

(22) PCT Filed: Jan. 15, 2021

(86) PCT No.: PCT/EP2021/050814
§ 371 (c)(1),
(2) Date: Jul. 15, 2022

(87) PCT Pub. No.: WO2021/144425
PCT Pub. Date: Jul. 22, 2021

(65) Prior Publication Data
US 2023/0053203 A1     Feb. 16, 2023

(30) Foreign Application Priority Data
Jan. 16, 2020   (FR) ........................................ 2000412

(51) Int. Cl.
*H02M 3/156*     (2006.01)
(52) U.S. Cl.
CPC ................... *H02M 3/156* (2013.01)
(58) Field of Classification Search
CPC ..... G05F 1/00; G05F 1/10; G05F 1/12; G05F 1/46; G05F 1/455; G05F 1/45;
(Continued)

(56) References Cited
U.S. PATENT DOCUMENTS 6,294,954 B1    9/2001   Melanson
10,205,382 B2 *  2/2019   Antongirolami ....... H02M 1/38
(Continued)

FOREIGN PATENT DOCUMENTS

EP   1639693 A1   3/2006
FR   3025949 A1   3/2016
(Continued)

OTHER PUBLICATIONS

Preliminary Rejection in corresponding Korean Application No. 2022-7028179, dated Nov. 29, 2023 (4 pages).
(Continued)

*Primary Examiner* — Jeffrey A Gblende
(74) *Attorney, Agent, or Firm* — Osha Bergman Watanabe & Burton LLP (57) ABSTRACT

A switching system is disclosed having a switching arm with a high-side switch and a low-side switch. A control system switches the switching arm alternately between a first configuration, in which the high-side switch is open and the low-side switch is closed, and a second configuration, in which the high-side switch is closed and the low-side switch is open. The control system commands, for each switching operation, the opening of the switch that is initially closed, and then, at the end of a dead time, commands the closure of the switch that is initially open. The system has device for measuring a switch voltage present between the terminals of one of the switches. For each switching operation, the control system, following the command to open the switch initially closed, monitors the measured switch voltage, and determine the dead time for the switching operation based on the monitored switch voltage.

8 Claims, 5 Drawing Sheets

(58) Field of Classification Search
CPC ... G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088; H02M 1/0048; H05B 39/048; B23K 11/24; H04B 2215/069

See application file for complete search history.

(56) References Cited

U.S. PATENT DOCUMENTS

| | | | |
|---|---|---|---|
| 11,011,937 B2 * | 5/2021 | Hosotani | H02M 3/01 |
| 11,316,423 B2 * | 4/2022 | Fromme | H02M 1/38 |
| 11,750,086 B2 * | 9/2023 | Aoki | H02M 1/385 |
| | | | 327/109 |
| 2010/0020569 A1 | 1/2010 | Melanson et al. | |

FOREIGN PATENT DOCUMENTS

| | | | |
|---|---|---|---|
| FR | 3064847 | A1 | 10/2018 |
| WO | 0122585 | A1 | 3/2001 |
| WO | 2005/055404 | A2 | 6/2005 |
| WO | 2014/035775 | A2 | 3/2014 |

OTHER PUBLICATIONS

International Search Report and Written Opinion in corresponding International Application No. PCT/EP2021/050814, mailed Mar. 22, 2021 (16 pages).

* cited by examiner

SWITCHING SYSTEM AND METHOD WITH DOWN TIME, CORRESPONDING COMPUTER PROGRAM

The present invention relates to a switching system with dead time, and to a switching method with dead time and to a corresponding computer program.

The prior art discloses a switching system of the type comprising:
- a switching arm comprising two switches, a high-side switch and a low-side switch, each having a current input terminal and a current output terminal, the current output terminal of the high-side switch and the current input terminal of the low-side switch being connected to one another;
- a control system for controlling the switching arm, designed to switch the switching arm alternately between a first configuration, in which the high-side switch is open and the low-side switch is closed, and a second configuration, in which the high-side switch is closed and the low-side switch is open, the control system being designed, for each switching operation, to:
    - command the opening of the switch that is initially closed, and then,
    - at the end of a dead time, command the closure of the switch that is initially open; and
- a measuring device for measuring a switch voltage present between the terminals of one of the switches.

Such a switching system is for example used in a DC/DC converter or else in an integrated charger (on-board charger or OBC), or even in an inverter/rectifier connected to an electric machine able to operate selectively in motor mode and in generator mode.

The measuring device is generally present in order to implement various functions, and in particular to detect a state of desaturation of the switch on which the measuring device is provided.

The dead time first of all serves to ensure that the switch whose opening is commanded is actually opened correctly before commanding the closure of the other switch, in order to ensure that the two switches are not in the on state at the same time (cross conduction).

Moreover, it is known to place, in parallel with each switch, a capacitor that allows soft switching, that is to say substantially loss-free switching, also denoted by the acronym ZVS (standing for zero-voltage switching). The complete charging or the complete discharging of these capacitors is necessary to allow the closure of the switch with a zero or virtually zero voltage across its terminals. The dead time thus makes it possible to ensure the complete charging or discharging of the capacitors.

It is first of all known to set the dead time to a fixed value, which corresponds for example to a value that always satisfies the conditions for soft switching regardless of the values of the inverter/rectifier/DC-DC or of the electric machine, and regardless of the switching frequency. As a result, such a dead time determined in this way is excessively lengthy in many cases.

It is also known to vary the duration of the dead time, based on dead time values that are predetermined in a laboratory. The control system may then use a predefined table, for example stored in a flash memory, giving the duration of the dead time as a function of the state of charge of the battery and/or of the operating point of the electric machine and/or of the switching frequency. The table generally contains data around only a few particularly important operating points. This solution has the drawback of requiring sensors, means for determining the operating point based on measurements from the sensors, a memory containing the predefined table and means for accessing the memory. All of these elements take up space and have a non-negligible cost.

It may thus be desirable to provide a switching system that makes it possible to overcome at least some of the abovementioned problems and constraints.

What is therefore proposed is a switching system of the abovementioned type, characterized in that the control system is furthermore designed, for each of at least one switching operation, to:
- following the command to open the switch that is initially closed, monitor the measured switch voltage; and
- determine the dead time for the switching operation under consideration based on the monitored switch voltage.

By virtue of the invention, determining the dead time requires few additional elements. More specifically, only the operation of the control system has to be adapted. Now, the control system is generally implemented by a microcontroller executing a computer program, and already receives the switch voltage measurement in order to implement other functions, such as detecting a state of desaturation. The adaptation of the control system may thus be reduced, in the simplest case, to simply updating its computer program.

Optionally, to determine the dead time for the switching operation under consideration based on the monitored switch voltage, the control system is designed to:
- detect when the switch voltage crosses a predefined threshold; and
- determine the dead time for the switching operation under consideration based on the detection of the crossing.

Also optionally, the determined dead time extends from the command to open the switch that is initially closed until the detection of the crossing.

Also optionally, the control system is designed to determine the dead time for the switching operation under consideration based on a time interval between the command to open the switch that is initially closed and the detection of the crossing, such that this dead time has an end later than the detection of the crossing.

Also optionally, the switch voltage is the voltage present between the terminals of the low-side switch.

Also optionally, the at least one switching operation comprises a switching operation from the first configuration to the second configuration.

Also optionally, the control system is furthermore designed, for each of at least one switching operation, to:
- command the opening of the switch that is initially closed;
- determine, based on the dead time of the previous switching operation, the dead time for the switching operation under consideration;
- at the end of the determined dead time, command the closure of the switch that is initially open.

Also optionally, the determined dead time is equal to the dead time of the previous switching operation.

Also optionally, the determined dead time is greater than the dead time of the previous switching operation, for example equal to the dead time of the previous switching operation plus a predefined duration.

Also optionally, the at least one switching operation comprises at least two successive switching operations.

Also optionally, the switching system furthermore comprises a capacitor between the terminals of the high-side switch and a capacitor between the terminals of the low-side switch.

What is also proposed is a method for switching a switching arm comprising a high-side switch having a current input terminal and a current output terminal and a low-side switch having a current input terminal and a current output terminal, the current output terminal of the high-side switch and the current input terminal of the low-side switch being connected to one another, the method comprising:
    switching the switching arm alternately between a first configuration, in which the high-side switch is closed and the low-side switch is open, and a second configuration, in which the high-side switch is open and the low-side switch is closed, each configuration switching operation comprising a command to open the switch that is initially closed, and then, at the end of a dead time, a command to close the switch that is initially open;
    characterized in that it furthermore comprises:
    following the command to open the closed switch, monitoring a switch voltage present between the terminals of one of the switches; and
    determining the dead time for the present switching operation based on the monitored switch voltage.

The invention furthermore relates to a switching system comprising:
    a switching arm intended to be connected to a voltage source designed to supply a DC voltage and comprising two switches, a high-side switch and a low-side switch, each having a current input terminal and a current output terminal, the current output terminal of the high-side switch and the current input terminal of the low-side switch being connected to one another at a center tap;
    a control system for controlling the switching arm, designed to switch the switching arm alternately in two directions between a first configuration, in which the high-side switch is open and the low-side switch is closed, so that the center tap has a zero voltage, and a second configuration, in which the high-side switch is closed and the low-side switch is open, so that the center tap has the DC voltage, the control system being designed, for each switching operation, to:
        command the opening of the switch that is initially closed, and then,
        at the end of a dead time, command the closure of the switch that is initially open; and
    a measuring device for measuring a switch voltage present between the terminals of one of the switches;
    wherein the control system is furthermore designed, for a first switching operation in which the switching arm switches in a first direction of the two directions, to:
        following the command to open the switch that is initially closed, monitor the measured switch voltage; and
        determine the dead time for this first switching operation based on the monitored switch voltage, by:
            detecting when the switch voltage crosses a predefined threshold between the zero voltage and the DC voltage, and
            determining the dead time for this first switching operation based on the detection of the crossing;
    and wherein the control system is furthermore designed, for a second switching operation following the first switching operation and in which the switching arm switches in the other of the two directions, to:
        command the opening of the switch that is initially closed;
        determine, based on the dead time of the previous first switching operation, the dead time for this second switching operation; and
        at the end of the dead time determined for this second switching operation, command the closure of the switch that is initially open.

Optionally, the determined dead time extends from the command to open the switch that is initially closed until the detection of the crossing.

Also optionally, the control system is designed to determine the dead time for the first switching operation based on a time interval between the command to open the switch that is initially closed and the detection of the crossing, such that this dead time has an end later than the detection of the crossing.

Also optionally, the switch voltage is the voltage present between the terminals of the low-side switch.

Also optionally, the first switching operation is a switching operation from the first configuration to the second configuration.

Also optionally, the dead time for the second switching operation is taken to be equal to the dead time of the first switching operation.

Also optionally, the dead time for the second switching operation is greater than the dead time of the first switching operation, for example equal to the dead time of the first switching operation plus a predefined duration.

Also optionally, the switching system furthermore comprises a capacitor between the terminals of the high-side switch and a capacitor between the terminals of the low-side switch.

What is also proposed is a method for switching a switching arm intended to be connected to a voltage source designed to supply a DC voltage and comprising a high-side switch having a current input terminal and a current output terminal and a low-side switch having a current input terminal and a current output terminal, the current output terminal of the high-side switch and the current input terminal of the low-side switch being connected to one another at a center tap, the method comprising:
    switching the switching arm alternately in two directions between a first configuration, in which the high-side switch is open and the low-side switch is closed, so that the center tap has a zero voltage, and a second configuration, in which the high-side switch is closed and the low-side switch is open, so that the center tap has the DC voltage, each configuration switching operation comprising a command to open the switch that is initially closed, and then, at the end of a dead time, a command to close the switch that is initially open;
    furthermore comprising, for a first switching operation in which the switching arm switches in a first of the two directions:
        following the command to open the closed switch, monitoring a switch voltage present between the terminals of one of the switches; and
        determining the dead time for this present first switching operation based on the monitored switch voltage, by:
            detecting when the switch voltage crosses a predefined threshold between the zero voltage and the DC voltage, and
            determining the dead time for this first switching operation based on the detection of the crossing;
    and furthermore comprising, for a second switching operation following the first switching operation and in which the switching arm switches in the other of the two directions:
        commanding the opening of the switch that is initially closed;

determining, based on the dead time of the first switching operation, the dead time for this second switching operation; and at the end of the dead time determined for this second switching operation, commanding the closure of the switch that is initially open.

What is also proposed is a computer program able to be downloaded from a communication network and/or stored on a computer-readable medium, characterized in that it comprises instructions for executing the steps of a switching method according to the invention when the computer program is executed on a computer.

The invention will be better understood with the aid of the following description, which is given solely by way of example and with reference to the appended drawings, in which.

Figure 1:
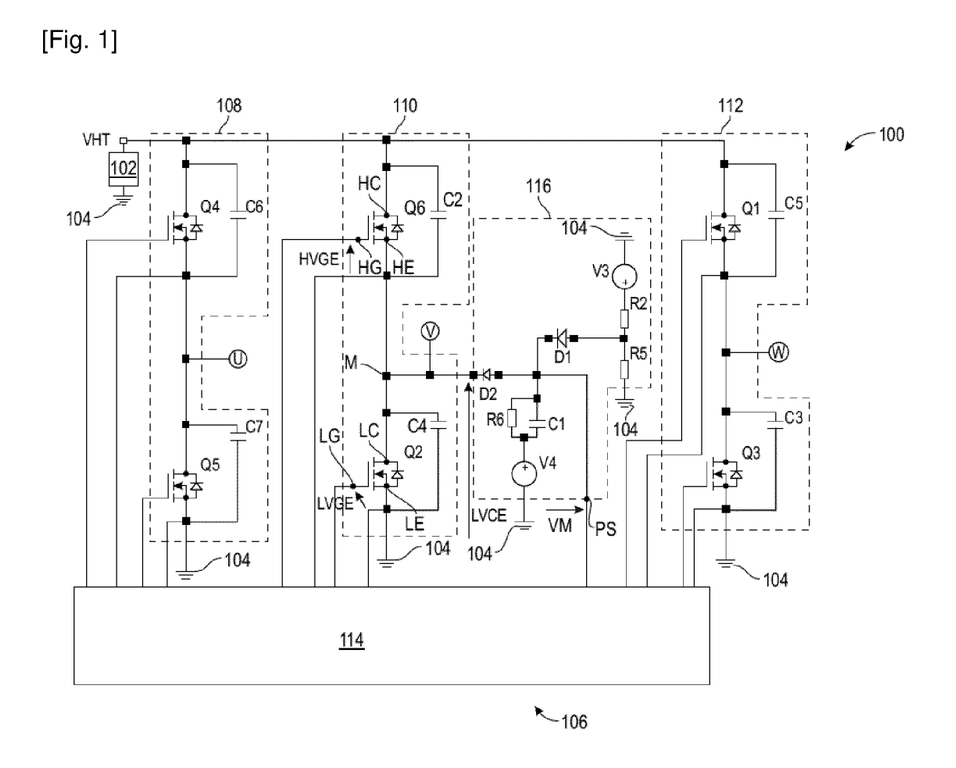
FIG. 1 is a circuit diagram illustrating a switching system according to one embodiment of the invention.

With reference to FIG. 1, one example of an electrical installation 100 implementing the invention will now be described.

The electrical installation 100 for example forms part of a motor vehicle, such as a vehicle with electric or else electric and thermal hybrid propulsion.

The electrical installation 100 first of all comprises an electric machine having three phases U, V, W, for example stator phases. The electric machine is for example designed to operate selectively in motor mode and in generator mode.

The electrical installation 100 furthermore comprises a DC voltage source 102 designed to supply a DC voltage VHT with respect to an electrical ground 104 of the electrical installation 100. The voltage source 102 comprises for example a battery. The voltage VHT is generally high, for example greater than 100 V.

The electrical installation 100 furthermore comprises a voltage converter 106 designed to perform a conversion between the DC voltage VHT and AC phase voltages respectively present on the phases U, V, W.

For this purpose, the voltage converter 106 comprises three switching arms 108, 110, 112, respectively dedicated to the phases U, V, W of the electric machine and designed to alternately connect the associated phase U, V, W to the voltage source 102 (that is to say the DC voltage VHT) and to the electrical ground 104 (that is to say to the zero voltage). When the electric machine operates in motor mode, the voltage converter 106 is designed to operate in inverter mode so as to convert the DC voltage VHT into the phase voltages. When the electric machine operates in generator mode, the voltage converter 106 is designed to operate in rectifier mode so as to convert the phase voltages into the DC voltage VHT, for example in order to recharge the DC voltage source 102.

The switching arms 108, 110, 112 are identical, and so only the switching arm 110 will be described in detail.

The switching arm 110 comprises, on the one hand, a high-side switch Q6 having a current input terminal HC and a current output terminal HE and, on the other hand, a low-side switch Q2 having a current input terminal LC and a current output terminal LE. The current output terminal HE of the high-side switch 104 and the current input terminal LC of the low-side switch 106 are connected to one another at a center tap M, which is itself connected to one of the respective phases of the electric machine, the phase V for the switching arm 110. Furthermore, the current input terminal HC of the high-side switch Q6 is connected to the DC voltage source 102 and the current output terminal LE of the low-side switch Q2 is connected to the electrical ground 104.

Each switch Q6, Q2 furthermore has a control terminal, respectively referenced HG and LG. Each control terminal HG, LG is intended to receive a command to selectively open and close the corresponding switch Q6, Q2. When open, respectively closed, the switch Q6, Q2 is designed to prevent, respectively allow, a current to flow through it from its current input terminal HC, LC to its current output terminal HE, LE. The command is generally in the form of a voltage between the control terminal and the current output terminal, this voltage being denoted HVGE for the high-side switch Q6 and LVGE for the low-side switch Q2.

The switching arm 110 furthermore comprises a capacitor C2 between the terminals HC, HE of the high-side switch Q6 and a capacitor C4 between the terminals LC, LE of the low-side switch Q2. The capacitors C2, C4 are soft-switching capacitors, also referred to by the acronym ZVS (standing for zero-voltage switching).

The switches Q6, Q2 are for example semiconductor transistors, such as MOSFETs (acronym for metal-oxide semiconductor field-effect transistor), or else IGBTs (acronym for insulated-gate bipolar transistor).

The voltage converter 106 furthermore comprises a control system 114 for controlling the switching arms 108, 110, 112, designed to switch each switching arm 108, 110, 112 alternately between a first configuration, in which the high-side switch is open and the low-side switch is closed, and a second configuration, in which the high-side switch is closed and the low-side switch is open. Thus, in the first configuration, the phase U, V, W associated with the switching arm 108, 110, 112 is connected to the electrical ground 104 so as to have the zero voltage applied thereto, while in the second configuration, the phase U, V, W associated with the switching arm 108, 110, 112 is connected to the DC voltage source 102 so as to have the DC voltage VHT applied thereto. For this purpose, the control system 114 is designed, for each configuration switching operation, to command the opening of the switch that is initially closed, and then, at the end of a dead time, command the closure of the switch that is initially open. A switch that is initially closed, respectively open, is understood to mean the switch in the closed, respectively open, state at the start of the present switching operation.

The operation of the control system 114 will be described in more detail below with reference to FIGS. 2 to 5.

The voltage converter 106 furthermore comprises a measuring device 116 for measuring a switch voltage present between the current input and output terminals of one of the switches Q6, Q2.

In the example described, the measured switch voltage is the voltage LVCE present between the current input and output terminals LC, LE of the low-side switch Q2.

Still in the example described, the measuring device 116 is designed to provide the control system 114 with a measured voltage VM representative of the voltage LVCE. More specifically, in the example described, the measured voltage VM is a waveform of the voltage LVCE. For this purpose, the measuring device 116 comprises for example a high-frequency filtering element designed to filter high frequencies of the voltage LVCE so as to keep only low frequencies forming the waveform of the voltage LVCE.

In the example described, the measuring device 116 first of all comprises an output point PS intended to have the measured voltage VM.

The measuring device 116 furthermore comprises an input diode D2 connected between the center tap M and the output point PS, allowing conduction in the direction of the center tap M.

The measuring device 116 furthermore comprises a first DC voltage source V4, for example of 12 V.

The measuring device 116 furthermore comprises a high-frequency filtering circuit comprising a capacitor C1 and a resistor R6 in parallel, connected together between the DC voltage source V4 and the output point PS.

The measuring device 116 furthermore comprises a second DC voltage source V3, for example of 12 V, and a voltage divider circuit comprising a resistor R2 and a resistor R5 connected to one another at a center tap.

The measuring device 116 furthermore comprises a diode D1 connected between the center tap of the resistors R2, R5 and the output terminal S.

Figure 2:
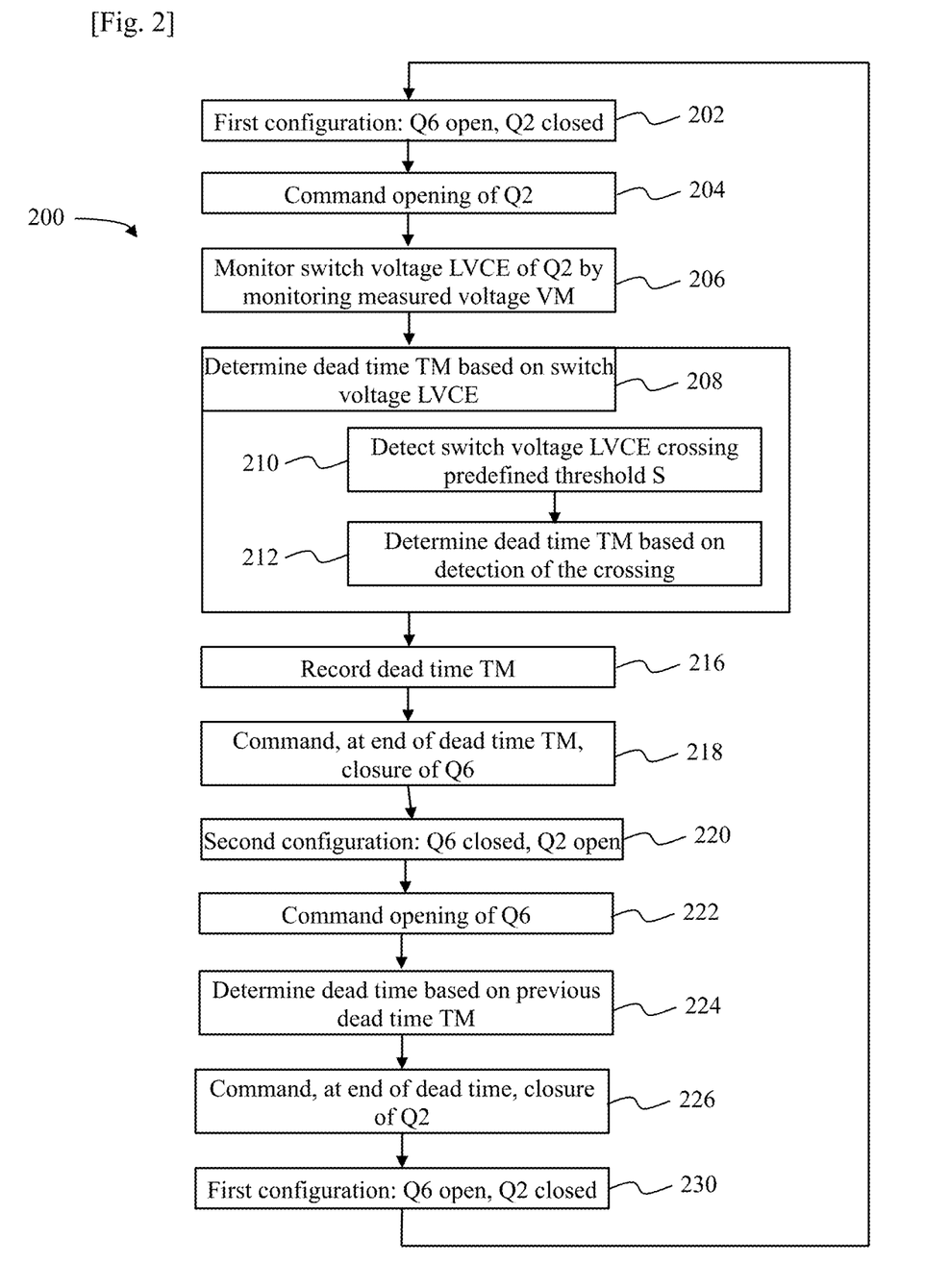
FIG. 2 is a block diagram illustrating the steps of a switching method according to one embodiment of the invention.
Figure 3:
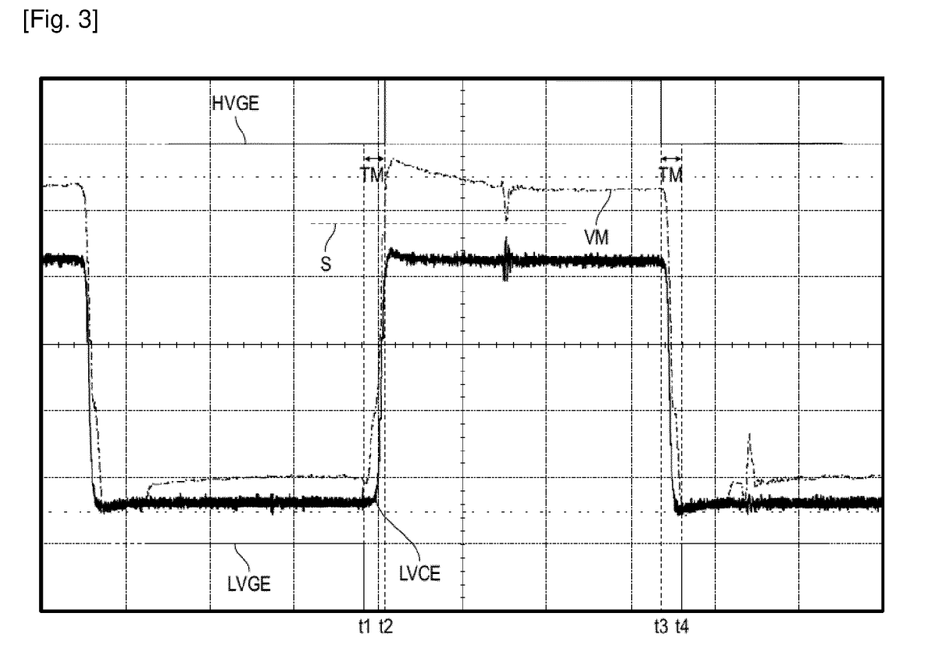
FIG. 3 is a timing diagram illustrating the evolution over time of electrical quantities of the switching system of FIG. 1, when implementing the method of FIG. 2.

With reference to FIGS. 2 and 3, one example of a switching method 200 according to a first embodiment of the invention will now be described.

At the start of the method 200, in a step 202, the switching arm 110 is in the first configuration: the high-side switch Q6 is open, while the low-side switch Q2 is closed.

In a step 204, the control system 114 starts, at a time t1, a switching operation from the first configuration to the second configuration, by commanding the opening of the switch that is initially closed, that is to say, in this case, the low-side switch Q2.

In a step 206, following the command to open the low-side switch Q2, the control system 114 monitors the switch voltage LVCE of the low-side switch Q2 by monitoring the measured voltage VM.

In a step 208, the control system 114 determines the dead time TM for the present switching operation based on the monitored switch voltage LVCE.

For this purpose, in a step 210, the control system 114 detects, at a time t2, that the switch voltage LVCE crosses a predefined threshold S. Using the waveform advantageously makes it possible to limit rapid oscillations around the threshold, and therefore unwanted detections.

Next, in a step 212, the control system 114 determines the dead time TM based on the detection of the crossing. In the example described, the dead time TM extends from the opening command (time t1) to the detection of the crossing (time t2).

The dead time TM is thus determined using the following equation:

$$TM = t2 - t1 \qquad \text{[Math. 1]}$$

As an alternative, the dead time TM could be determined based on the time interval t2−t1 between the command to open the low-side switch Q2 (time t1) and the detection of the crossing (time t2), such that this dead time TM has an end later than the detection of the crossing t2, in order to be able to be used for the present switching operation.

For example, the dead time TM could extend from the opening command (time t1) to the detection of the crossing (time t2) plus a predefined duration P1. The dead time TM would thus be determined using the following equation:

$$TM = t2 - t1 + P1 \qquad \text{[Math. 2]}$$

In a step 216, the control system 114 records the dead time TM.

In a step 218, the control system 114 commands, at the end of the dead time TM, the closure of the switch that is initially open, that is to say, in this case, the high-side switch Q6.

Thus, when the dead time TM extends from the opening command (time t1) to the detection of the crossing (time t2), the control system 114, upon detection of the crossing, commands the closure of the switch that is initially open, that is to say, in this case, the high-side switch Q6.

Step 218 could be performed before or during step 216.

The switching operation from the first configuration to the second configuration is thus ended and the switching arm 110, in a step 220, is correctly in its second configuration: the high-side switch Q6 is closed and the low-side switch Q2 is open.

In a step 222, the control system 114 starts a new switching operation at a time t3 by commanding the opening of the switch that is initially closed, that is to say, in this case, the high-side switch Q6.

In a step 224, the control system 114 determines, based on the dead time TM of the previous switching operation, the dead time for the present switching operation.

In the example described, the dead time for the present switching operation is equal to the dead time TM of the previous switching operation.

Thus, at the end of the dead time TM, in a step 226, the control system 114 commands the closure of the switch that is initially open, that is to say, in this case, the low-side switch Q2.

As an alternative, the determined dead time could be greater than the dead time TM of the previous switching operation, for example equal to the dead time of the previous switching operation plus a predefined duration P2. In this case, the following equation could be used:

$$TM(\text{following}) = TM(\text{previous}) + P2 \qquad \text{[Math. 3]}$$

The switching operation from the second configuration to the first configuration is thus ended and the switching arm 110, at the end of a step 230, is correctly in its first configuration: the high-side switch Q6 is closed and the low-side switch Q2 is open.

The method 200 may then be repeated by returning to step 202.

Figure 4:
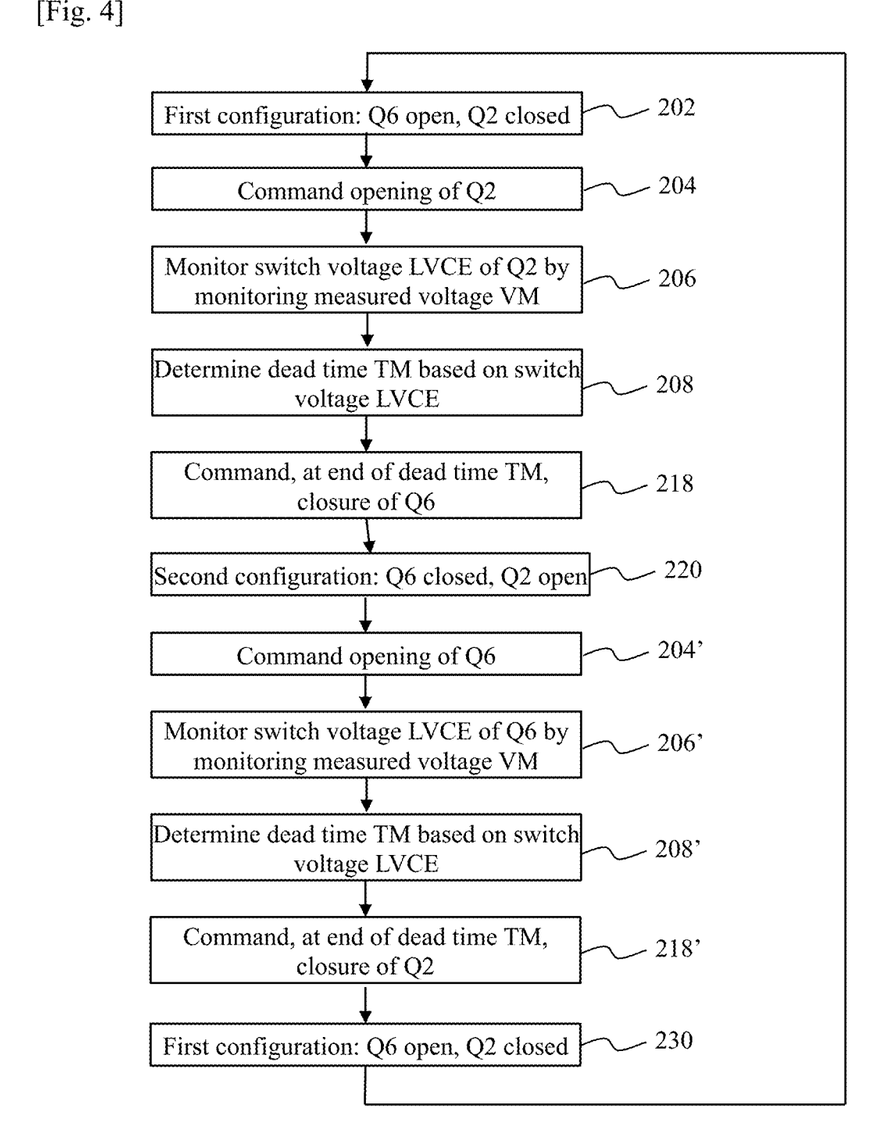
FIG. 4 is a block diagram illustrating the steps of a switching method according to another embodiment of the invention.
Figure 5:
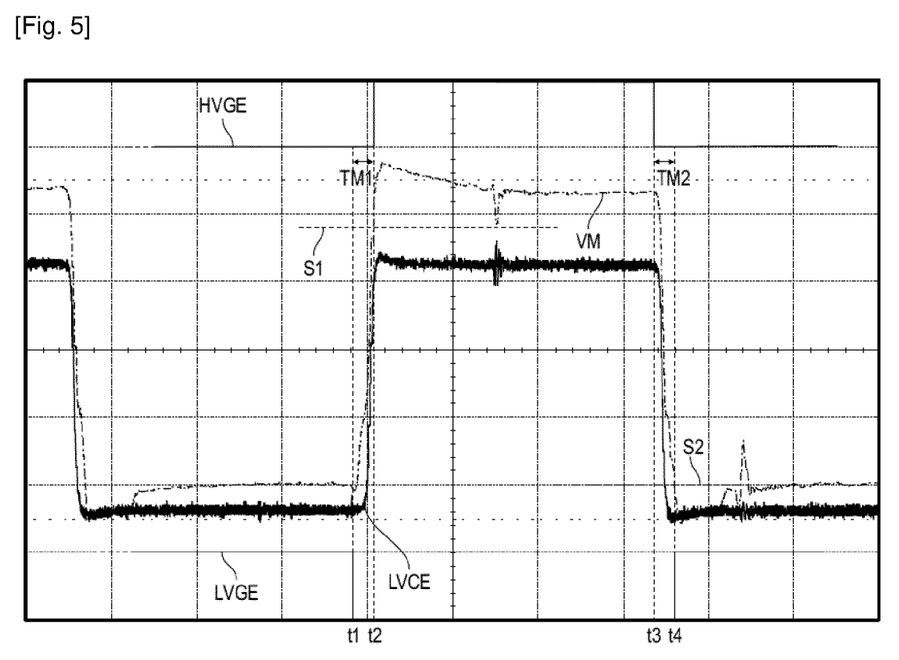
FIG. 5 is a timing diagram illustrating the evolution over time of electrical quantities of the switching system of FIG. 1, when implementing the method of FIG. 4.

With reference to FIGS. 4 and 5, one example of a switching method 400 according to a second embodiment of the invention will now be described.

In this second embodiment of the invention, the dead time of each of the successive switching operations is determined based on the monitored switch voltage, whereas, in the first embodiment of the invention, the dead times of the switching operations from the second to the first configuration were each determined based on the dead time of the previous switching operation (switching operation from the first to the second configuration).

When a threshold crossing is used to determine the dead time, a different threshold is preferably used for the switching operations from the first to the second configuration and for the switching operations from the second to the first configuration. These thresholds are respectively denoted S1 and S2, and the threshold S1 is greater than the threshold S2.

More specifically, the method 400 comprises the steps 202 to 220 already described, in relation to the switching operation from the first to the second configuration.

For the reverse switching operation (from the second to the first configuration), the method 400 comprises steps 204', 206', 208' and 218', respectively identical to steps 204, 206, 208 and 218, except the roles of the switches are reversed and the threshold S2 is used instead of the threshold S1, thereby possibly giving a dead time TM2 for the present switching operation different from the dead time TM1 of the previous switching operation.

As has been described above, in the first configuration of the switching arms 108, 110, 112, the center tap M is connected to the electrical ground 104 so as to have the zero voltage applied thereto and therefore have this zero voltage, whereas, in the second configuration, the center tap M is connected to the DC voltage source 102 so as to have the DC voltage VHT applied thereto and therefore have this DC voltage VHT.

Furthermore, advantageously and as illustrated in the figures, each of the predefined thresholds S, S1, S2 is between the zero voltage and the DC voltage VHT. In the example described, with the DC voltage VHT being positive, these thresholds are therefore positive. Furthermore, for example, the threshold S and the threshold S1 are each between 85% and 95% of the DC voltage VHT, whereas the threshold S2 is for example between 5% and 15% of the DC voltage VHT.

It is clearly apparent that a switching system such as the one described above makes it possible to determine dead times solely based on the switch voltage and predefined data (P1, P2 in the example described), which are independent of the operating state of the voltage converter and/or of the electric machine. Furthermore, the dead times are determined by measuring the switch voltage, with therefore substantially similar reliability regardless of the operating point of the electric machine and with very simple hardware means:

adaptation of the control system and a measuring device that may be very simple, such as the one illustrated in FIG. 1.

It will also be noted that the invention is not limited to the embodiments described above. Indeed, it will be apparent to a person skilled in the art that various modifications may be made to the embodiments described above in light of the teaching that has just been disclosed to them.

In particular, the dead time for the present switching operation could be determined based on the monitored switch voltage in a manner other than by detecting a threshold crossing. For example, the dead time for the present switching operation could be determined based on a slope of the monitored switch voltage.

Furthermore, the measured switch voltage could be that of the high-side switch, for example between the center tap M and the DC voltage source 102.

The invention may furthermore be transposed to any electrical device using a switching arm, such as DC/DC voltage converters or else an on-board charger, and in particular when soft switching is desirable.

The described steps could moreover be performed in any other technically feasible order.

In the detailed disclosure of the invention given above, the terms that are used should not be interpreted as limiting the invention to the embodiments disclosed in the present description, but should be interpreted so as to include therein all equivalents the provision of which is within the capability of a person skilled in the art by applying their general knowledge to implementing the teaching that has just been disclosed to them.

The invention claimed is:

1. A switching system comprising:
a switching arm configured to be connected to a voltage source configured to supply a DC voltage and comprising a high-side switch and a low-side switch, each of the high-side switch and the low-side switch having a current input terminal and a current output terminal, the current output terminal of the high-side switch being connected to the current input terminal of the low-side switch at a center tap;
a control system for controlling the switching arm configured to switch the switching arm alternately in two directions between a first configuration, in which the high-side switch is open and the low-side switch is closed, so that the center tap has a zero voltage, and a second configuration, in which the high-side switch is closed and the low-side switch is open, so that the center tap has the DC voltage; and
a measuring device for measuring a switch voltage present between the current input and output terminals of either of the high-side switch and the low-side switch;
wherein the control system is configured, for a first switching operation in which the switching arm switches in a first direction of the two directions, to:
command an opening of a first switch of the high-side switch and the low-side switch that is initially closed;
following the command to open the first switch that is initially closed, monitor the measured switch voltage;
determine a dead time for the first switching operation based on the monitored switch voltage, by:
detecting when the switch voltage crosses a predefined threshold between the zero voltage and the DC voltage; and
determining the dead time for the first switching operation based on the detection of the crossing; and
at an end of the dead time determined for the first switching operation, command a closure of a second switch of the high-side switch and the low-side switch that is initially open;
wherein the control system is further configured, for a second switching operation following the first switching operation and in which the switching arm switches in a second direction of the two directions, to:
command an opening of the second switch that has been closed in the first switching operation;
determine, based on the dead time of the first switching operation, a dead time for the second switching operation; and
at an end of the dead time determined for the second switching operation, command a closure of the first switch that is initially has been opened in the first switching operation,
wherein the control system is configured to determine the dead time for the first switching operation based on a time interval between the command to open the first switch that is initially closed and the detection of the crossing, such that the dead time determined for the first switching operation has an end later than the detection of the crossing.

2. The switching system as claimed in claim 1, wherein the switch voltage is a voltage present between the current input and output terminals of the low-side switch.

3. The switching system as claimed in claim 1, wherein the first switching operation is a switching operation from the first configuration to the second configuration.

4. The switching system as claimed in claim 1, wherein the dead time for the second switching operation is taken to be equal to the dead time of the first switching operation.

5. The switching system as claimed in claim 1, wherein the dead time for the second switching operation is taken to be equal to the dead time of the first switching operation plus a predefined duration.

6. The switching system as claimed in claim 1, furthermore comprising a capacitor between the current input and output terminals of the high-side switch and a capacitor between the current input and output terminals of the low-side switch.

7. A method for switching a switching arm connected to a voltage source configured to supply a DC voltage and comprising a high-side switch having a current input terminal and a current output terminal and a low-side switch having a current input terminal and a current output terminal, the current output terminal of the high-side switch being connected to the current input terminal of the low-side switch at a center tap, the method comprising:
  switching the switching arm alternately in two directions between a first configuration, in which the high-side switch is open and the low-side switch is closed, so that the center tap has a zero voltage, and a second configuration, in which the high-side switch is closed and the low-side switch is open, so that the center tap has the DC voltage; and
  for a first switching operation in which the switching arm switches in a first direction of the two directions:
    commanding an opening of a first switch of the high-side switch and the low-side switch that is initially closed;
    following the commanding of the opening of the first switch, monitoring a switch voltage present between the current input and output terminals of either of the high-side switch and the low-side switch;
    determining a dead time for the first switching operation based on the monitored switch voltage, by:
      detecting when the switch voltage crosses a predefined threshold between the zero voltage and the DC voltage; and
      determining the dead time for the first switching operation based on the detection of the crossing; and
    at an end of the dead time determined for the first switching operation, commanding a closure of a second switch of the high-side switch and the low-side switch that is initially open;
  for a second switching operation following the first switching operation and in which the switching arm switches in a second direction of the two directions:
    commanding an opening of the second switch that has been closed in the first switching operation;
    determining, based on the dead time of the first switching operation, a dead time for the second switching operation; and
    at an end of the dead time determined for the second switching operation, commanding a closure of the first switch that is initially has been opened in the first switching operation
  wherein the dead time for the first switching operation is determined based on a time interval between the command to open the first switch that is initially closed and the detection of the crossing, such that the dead time determined for the first switching operation has an end later than the detection of the crossing.

8. A computer program able to be downloaded from a communication network and/or stored on a non-transitory computer-readable medium, the computer program comprising instructions for executing the steps of a switching method as claimed in claim 7 when the computer program is executed on a computer.

* * * * *